United States Patent
Suzuki et al.

(10) Patent No.: US 6,647,961 B2
(45) Date of Patent: Nov. 18, 2003

(54) INTERNAL COMBUSTION ENGINE AND CONTROL METHOD OF THE SAME

(75) Inventors: Makoto Suzuki, Mishima (JP); Katuhiko Arisawa, Susono (JP); Masakazu Tabata, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 163 days.

(21) Appl. No.: 09/905,939

(22) Filed: Jul. 17, 2001

(65) Prior Publication Data

US 2002/0011236 A1 Jan. 31, 2002

(30) Foreign Application Priority Data

Jul. 26, 2000 (JP) .......................... 2000-225923

(51) Int. Cl.$^7$ .................................... F02P 5/00
(52) U.S. Cl. .................. 123/406.53; 123/142.5 R
(58) Field of Search ................ 123/406.53, 406.55, 123/686, 689, 142.5

(56) References Cited

FOREIGN PATENT DOCUMENTS

JP           6-185359 A           7/1994

*Primary Examiner*—John Kwon
(74) *Attorney, Agent, or Firm*—Oliff & Berridge, PLC (57) ABSTRACT

The internal combustion engine includes an engine preheating apparatus for preheating the internal combustion engine upon or before starting thereof. This internal combustion engine further includes an air-fuel ratio controller for setting an air-fuel ratio of the internal combustion engine that is preheated, to a value higher than that of the internal combustion engine that is not preheated, and/or an ignition-timing controller for retarding an ignition timing of the internal combustion engine that is preheated as compared with the ignition timing of the internal combustion engine that is not preheated.

18 Claims, 6 Drawing Sheets

INTERNAL COMBUSTION ENGINE AND CONTROL METHOD OF THE SAME

INCORPORATION BY REFERENCE

The disclosure of Japanese Patent Application No. 2000-225923 filed on Jul. 26, 2000 including the specification, drawings and abstract is incorporated herein by reference in its entirety.

BACKGROUND OF THE INVENTOIN

1. Field of the Invention

The invention generally relates to an internal combustion engine mounted on a vehicle and the like. More particularly, the invention relates to an internal combustion engine preheated upon or before starting, and a control method of the same.

2. Description of Related Art

In recent years, an internal combustion engine mounted on an automobile and the like is required to improve startability upon cold starting, reduce fuel consumption, and improve exhaust emission.

In response to these requirements, a heat-accumulating device for the engine as described in JP-A-6-185359 has been proposed. According to the disclosed heat-accumulating device, a water-cooled internal combustion engine includes a first cooling-water passage running through a cylinder block and a second cooling-water passage running through a cylinder head. A heat accumulator is provided in the second cooling-water passage. When the internal combustion engine is cold, the cooling water heated by the heat accumulator is circulated through the second cooling-water passage so as to allow early completion of warm-up of the water passage so as to allow early completion of warm-up of the intake system and fuel supply system by warming the cylinder head first.

Upon cold starting of the internal combustion engine, the fuel is likely to adhere to the wall surface of, for example, an intake port, a combustion chamber and the like because of the low temperature. Therefore, it is known that, when the internal combustion engine is cold, an air-fuel ratio of the engine is reduced taking into account of the amount of the fuel adhering to the wall surface.

In the conventional heat-accumulating device for the engine as described above, however, the air-fuel ratio of the engine is not taken into account in the case of warm-up of the intake system and fuel supply system using hot cooling water stored in a heat-accumulating container. Therefore, the heat-accumulating device may be controlled to reduce the air-fuel ratio despite the fact that the wall-surface temperature of the intake port or combustion chamber has been increased.

If the air-fuel ratio is reduced at a high temperature of the wall surface of the intake port, combustion chamber and the like, a fuel-rich mixture is produced. As a result, a relatively large amount of unburned fuel components is discharged from the internal combustion engine, thereby possibly degrading the exhaust emission.

It is also known that, at a cold starting of an internal combustion engine having spark plugs, for example, a gasoline engine, an exhaust purifying catalyst is not activated yet. Therefore, the ignition timing is retarded to raise the exhaust temperature such that the exhaust purifying catalyst is activated as early as possible. During the cold starting, however, combustion of the air-fuel mixture is likely to be unstable. In this respect, a degree of retarding the ignition timing is limited.

The conventional heat accumulating device for the engine as described above has not taken into account of the ignition timing set for warming up the intake system and fuel supplying system with the hot cooling water stored in the heat accumulating container. Therefore, the degree of retarding the ignition timing may possibly be limited despite the fact that the ignition performance and combustion stability of the air-fuel mixture have been obtained by warming up the intake system and fuel supplying system.

If the degree of retarding the ignition timing is limited when the ignition performance and combustion stability of the air-fuel mixture have been compensated by warming up the intake system and fuel supply system, the exhaust temperature cannot be raised to a desired value. As a result, it may take a long time to activate the exhaust purifying catalyst.

SUMMARY OF THE INVENTION

The invention is made in view of the foregoing problems, and it is an object of the invention to prevent degradation in the exhaust emission and to enable early activation of an exhaust purifying catalyst using a technique capable of optimally controlling the air-fuel ratio and/or the ignition timing of the internal combustion engine that is preheated before or upon starting.

In order to solve the aforementioned problems, the invention employs the following apparatus:

An internal combustion engine of the invention is provided with an engine preheating apparatus which preheats the internal combustion engine upon or before starting thereof, and an air-fuel ratio controller which sets an air-fuel ratio of the internal combustion engine that is preheated by the engine preheating apparatus to a value higher than the air-fuel ratio of the internal combustion engine that is not preheated by the engine preheating apparatus.

In this case, the air-fuel ratio of the internal combustion engine that is preheated upon or before starting thereof is set to a value higher than the air-fuel ratio of the internal combustion engine that is not preheated.

In the case where the internal combustion engine is not preheated upon or before starting thereof, the wall surface of an intake air passage, combustion chamber or the like in the internal combustion engine is at a low temperature. Therefore, the fuel is unlikely to be vaporized. So the amount of fuel adhered to the wall surface of the intake air passage, combustion chamber or the like (hereinafter referred to as a fuel adhesion amount) is increased. Meanwhile in the case where the internal combustion engine is preheated upon or before starting thereof, the wall surface of the intake air passage, combustion chamber or the like is at an increased temperature. Therefore, the fuel is likely to be vaporized, reducing the fuel adhesion amount.

In the case where the internal combustion engine is not preheated, the air-fuel ratio has to be reduced by increasing the fuel injection amount as the fuel adhesion amount increases. Meanwhile, in the case where the internal combustion engine is preheated, the fuel adhesion amount is reduced. Accordingly the necessity of reducing the air-fuel ratio by increasing the fuel injection amount is eliminated.

That is, the air-fuel ratio of the internal combustion engine that is preheated upon or before starting thereof is set to a value higher than the air-fuel ratio of the internal combustion engine that is not preheated. The resultant air-fuel ratio is not brought into a fuel-rich state. This makes it possible to prevent excessive unburned fuel components from being discharged from the internal combustion engine.

The air-fuel ratio controller may be constructed to change the air-fuel ratio according to a temperature of the internal combustion engine upon completion of the preheating by the engine preheating apparatus. Such control may be performed on the ground that the fuel adhesion amount strongly correlates with the temperature of the internal combustion engine, that is, the fuel adhesion amount is reduced as the temperature of the internal combustion engine increases.

The temperature of the internal combustion engine may include the wall-surface temperature of the intake air passage, and the wall-surface temperature of the combustion chambers.

An internal combustion engine of the invention is provided with an engine preheating apparatus which preheats the internal combustion engine upon or before starting thereof, and an ignition timing controller which retards an ignition timing of the internal combustion engine that is preheated by the engine preheating apparatus as compared with the ignition timing of the internal combustion engine that is not preheated.

According to such an internal combustion engine, the ignition timing of the internal combustion engine that is preheated upon or before starting thereof is retarded as compared with the internal combustion engine that is not preheated When the ignition timing is retarded in a cold state of the internal combustion engine, combustion is likely to become unstable owing to degradation in the ignition performance. By preheating the internal combustion engine, the intake air temperature and the compression end temperature increase and accordingly, vaporization of the fuel is facilitated. As a result, the temperature of the air-fuel mixture increases. Therefore, the ignition performance and combustion stability of the mixture are hardly influenced by retardation of the ignition timing.

Moreover, as the ignition timing of the internal combustion engine is retarded, the combustion timing of the mixture is delayed correspondingly. The burned gas at a relatively high temperature is discharged as the exhaust gas from the internal combustion engine immediately after combustion. When the high temperature exhaust gas is discharged from the internal combustion engine, an exhaust purifying catalyst provided in the exhaust passage of the internal combustion engine is heated by the exhaust gas, allowing early activation of the exhaust purifying catalyst.

The ignition-timing controller may be constructed to change a degree of retarding the ignition timing according to a temperature of the internal combustion engine upon completion of the preheating. Such control may be performed on the ground that the ignition performance and combustion stability of the mixture closely correlate with the temperature of the internal combustion engine. That is, the ignition performance and combustion stability of the mixture are improved as the temperature of the internal combustion engine increases.

An internal combustion engine of the invention is provided with an engine preheating apparatus which preheats the internal combustion engine upon or before starting thereof, an air-fuel ratio controller which sets an air-fuel ratio of the internal combustion engine that is preheated by the engine preheating apparatus to a value higher than the air-fuel ratio of the internal combustion engine that is not preheated, and an ignition-timing controller which retards an ignition timing of the internal combustion engine that is preheated as compared with the ignition timing of the internal combustion engine that is not preheated.

In the above case, the air-fuel ratio of the internal combustion engine that is preheated upon or before starting thereof is set to a value higher than the air-fuel ratio of the internal combustion engine that is not preheated. The ignition timing of the internal combustion engine that is preheated upon or before starting thereof is retarded as compared with the internal combustion engine that is not preheated. This makes it possible to prevent the air-fuel ratio from being fuel-rich, and to increase the exhaust gas temperature without deteriorating the combustion stability of the internal combustion engine. As a result, excessive unburned fuel components are not discharged from the internal combustion engine, and the exhaust purifying catalyst can be activated at an earlier stage.

The air-fuel ratio controller and the ignition timing controller may be constructed to change the air-fuel ratio and the degree of retarding the ignition timing, respectively according to a temperature of the internal combustion engine upon completion of the preheating.

The internal combustion engine of the invention may be constructed to further include an intake air amount controller which sets an intake air amount upon preheating of the internal combustion engine to a value larger than the intake air amount of the internal combustion engine that is not preheated.

In this case, combustion energy of the internal combustion engine is increased as the intake air amount increases. Accordingly, unnecessary reduction in the engine speed is reduced even when increasing the air-fuel ratio is increased and/or the degree of retarding the ignition timing are amount of the ignition timing.

The heating medium may include engine coolant, lubricant and the like.

DETAILED DESCRIPTION OF PREFERRED EMBODIMENTS

Hereinafter, specific embodiments of an internal combustion engine according to the invention will be described in conjunction with the accompanying drawings.

First Embodiment

A first embodiment of the internal combustion engine according to the invention will now be described referring to FIGS. 1 to 5.

Figure 1:
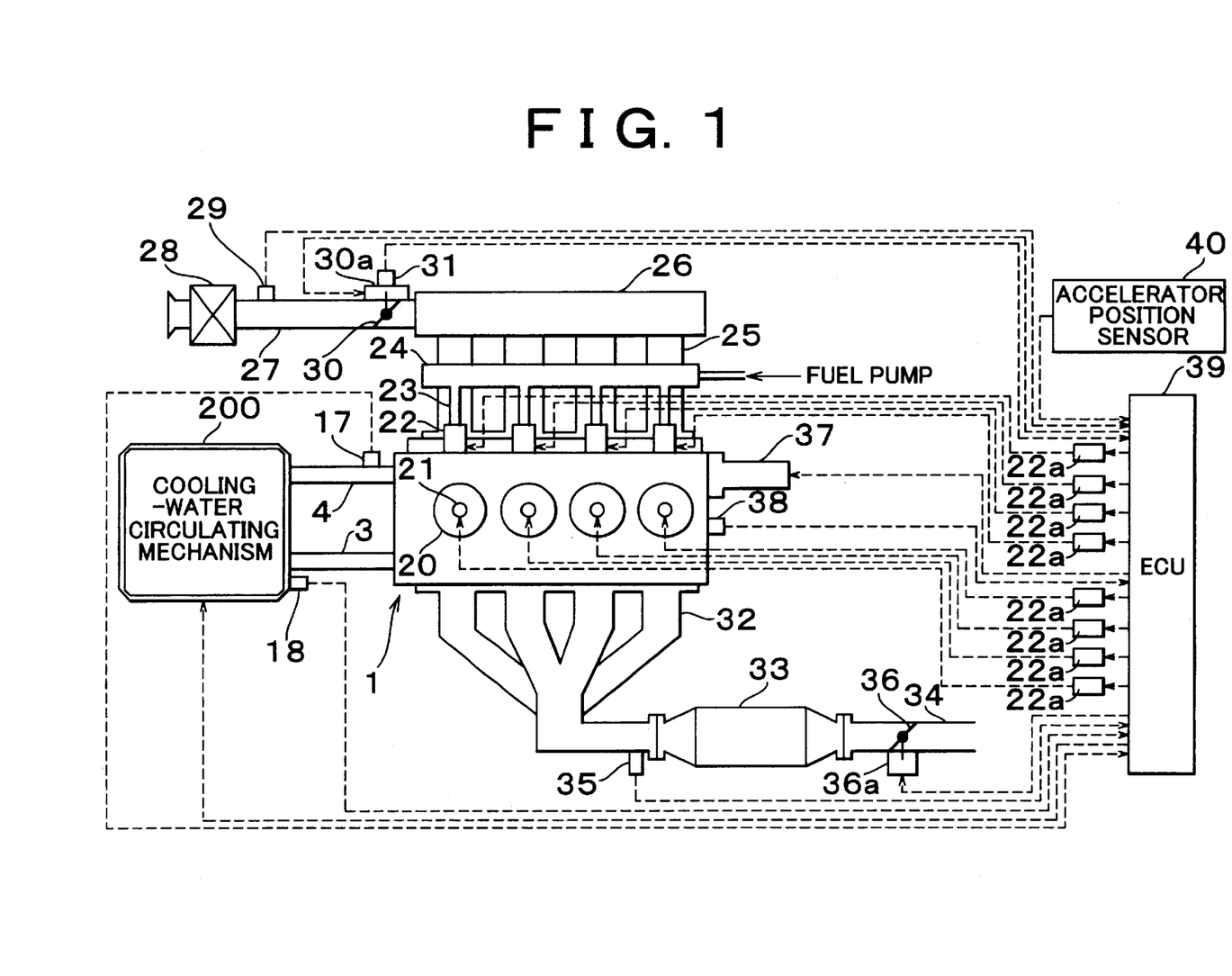
FIG. 1 is a diagram schematically showing the structure of an internal combustion engine according to the invention.

FIG. 1 is a diagram schematically showing the structure of the internal combustion engine according to the present embodiment.

The internal combustion engine 1 of FIG. 1 is a four-stroke cycle water-cooled gasoline engine including four cylinders 20.

The internal combustion engine 1 includes spark plugs 21 mounted so as to face combustion chambers of the respective cylinders 20. Igniters 21a are electrically connected to the respective spark plugs 21 to which the driving electric power is supplied.

The internal combustion engine 1 includes a starter motor 37 for rotating an engine output shaft (crankshaft) of the internal combustion engine 1 in response to application of driving electric power, and a crank position sensor 38 for outputting a pulse signal every rotation of the crankshaft at a predetermined angle (e.g., 10°).

The internal combustion engine 1 further includes fuel injection valves 22 having their respective nozzles facing intake ports (not shown) of the respective cylinders 20. Driving circuits 22a for supplying driving electric power to the corresponding fuel injection valves 22 are electrically connected to the respective fuel injection valves 22.

The fuel injection valves 22 communicate with a fuel delivery pipe 24 through respective fuel pipes 23. The fuel delivery pipe 24 communicates with a fuel pump (not shown).

In the fuel injection system thus structured, fuel discharged from the fuel pump is supplied to the fuel delivery pipe 24, and then is distributed from the fuel delivery pipe 24 to the fuel injection valves 22 of the respective cylinders 20 through the respective fuel pipes 23. When a driving current is applied from the driving circuits 22a to the fuel injection valves 22, the fuel injection valves 32 are opened to inject the fuel to the intake ports.

Intake branch pipes 25 are connected to the internal combustion engine 1. Each intake branch pipe 25 communicates with the combustion chamber of the corresponding cylinder 20 through a corresponding intake port (not shown).

The intake branch pipes 25 are connected to a surge tank 26, which in turn is connected to an air cleaner box 28 through an intake pipe 27.

The intake pipe 27 includes therein an intake throttle valve (hereinafter referred to as a throttle valve) 30 for adjusting the flow rate of the intake air flowing through the intake pipe 27. Mounted to the throttle valve 30 are a throttle actuator 30a formed from a stepper motor or the like, for opening and closing the throttle valve 30 according to the magnitude of applied electric power, and a throttle position sensor 31 for outputting an electric signal corresponding to the opening amount of the throttle valve 30.

An air flow meter 29 for outputting an electric signal corresponding to the mass of intake air flowing through the intake pipe 27 is mounted to the intake pipe 27 at a position upstream of the throttle valve 30.

In the intake system thus structured, the intake air introduced into the air cleaner box 28 flows into the intake pipe 27 after dust and the like are removed therefrom by an air cleaner (not shown) in the air cleaner box 28.

The intake air entering the intake pipe 27 flows into the surge tank 26 after the flow rate thereof is adjusted by the throttle valve 30. The intake air is then distributed from the surge tank 26 into each branch pipe 25.

The intake air distributed to the branch pipes 25 is introduced into the intake ports of the internal combustion engine 1, and then flows into the combustion chambers while being mixed with the fuel injected from the respective fuel injection valves 22. The mixture flowing into the combustion chambers is ignited and burned by the respective spark plugs 21.

Exhaust branch pipes 32 are also connected to the internal combustion engine 1. Each exhaust branch pipe 32 communicates with the combustion chamber of the corresponding cylinder 20 through a corresponding exhaust port (not shown). The exhaust branch pipes 32 are connected to an exhaust purifying catalyst 33, which in turn is connected to an exhaust pipe 34. The exhaust pipe 34 is connected to a not-show muffler at its downstream end.

The exhaust purifying catalyst 33 is activated when a catalyst bed of the exhaust purifying catalyst 33 is at a predetermined temperature or higher, for purifying harmful gas components in the exhaust gas, e.g., hydrocarbon (HC), carbon monoxide (CO) and nitrogen oxides (NOx).

An exhaust purifying catalyst 33 includes a three-way catalyst, an occlusion reduction type NOx catalyst, a selective reduction type NOx catalyst, an oxidation catalyst, and an appropriate combination of any of these catalysts.

An air-fuel ratio sensor 35 for outputting an electric signal corresponding to the air-fuel ratio of the exhaust flowing through the exhaust branch pipes 32 is mounted to the exhaust branch pipes 32 at a position immediately upstream of the exhaust purifying catalyst 33.

The exhaust pipe 34 includes therein an exhaust throttle valve 36 for adjusting the flow rate of the exhaust flowing through the exhaust pipe 34. An exhaust throttle actuator 36a for opening and closing the exhaust throttle valve 36 according to the magnitude of applied electric power is mounted to the exhaust throttle valve 36.

In the exhaust system thus structured, the mixture burned in each cylinder 20 of the internal combustion engine 1 (i.e., burned gas) is discharged into the respective exhaust branch pipes 32 through the respective exhaust ports, and then flows from the exhaust branch pipes 32 into the exhaust purifying catalyst 33. The exhaust gas flows into the exhaust purifying catalyst 33 where harmful gas components are removed for purification and then flows out therefrom to the exhaust pipe 34. The flow rate of the exhaust gas is adjusted by the exhaust throttle valve 36 as necessary and then discharged into the atmosphere through the muffler.

The internal combustion engine 1 is connected to a cooling-water circulating mechanism 200 through two cooling-water passages 4, 8. The structure of the cooling-water circulating mechanism 200 will be described referring to FIG. 2.

Figure 2:
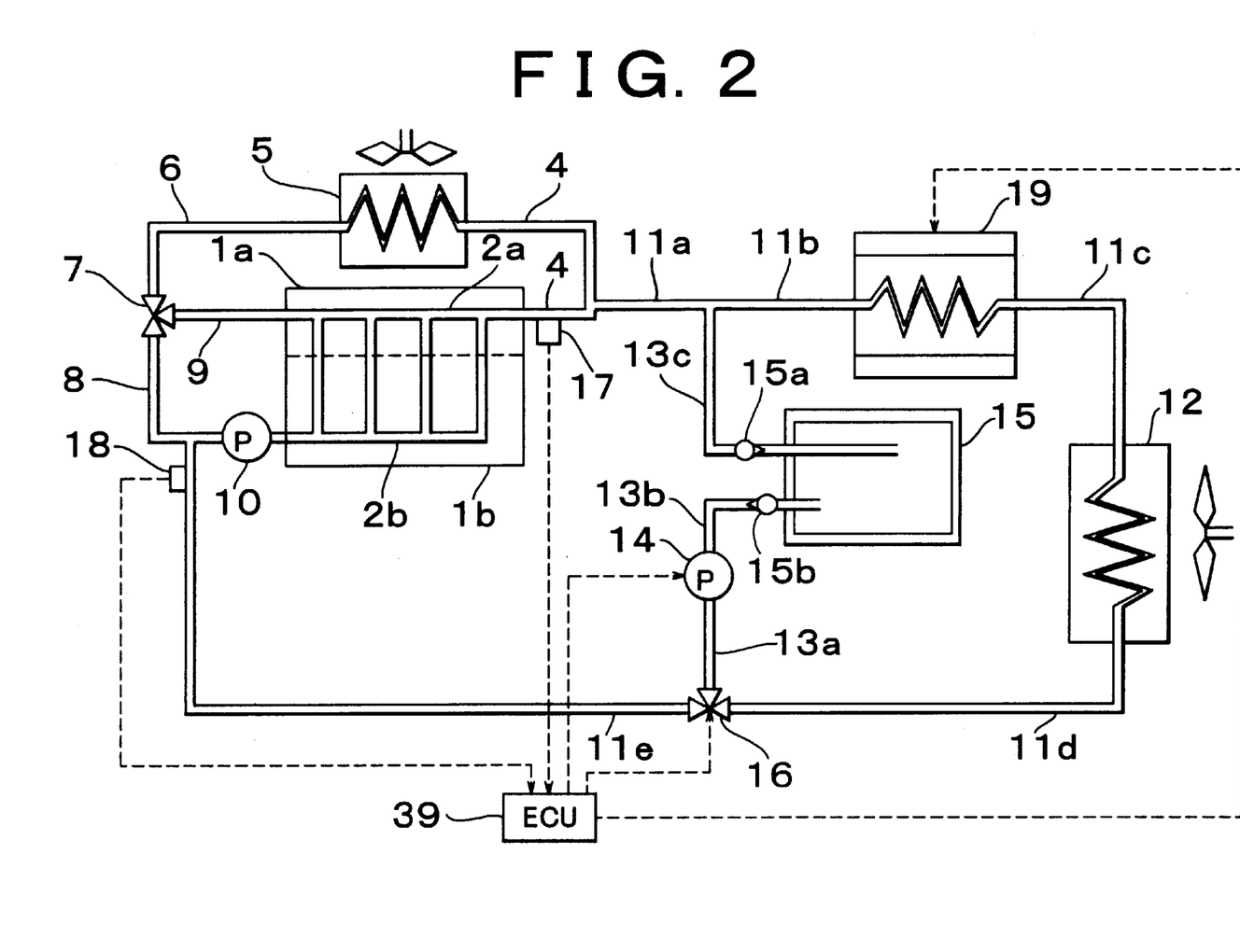
FIG. 2 is a diagram schematically showing the structure of a cooling-water circulating mechanism according to an embodiment of the invention.

FIG. 2 is a diagram schematically showing the structure of the cooling-water circulating mechanism 200 and a cooing-water circulating path that is formed within the internal combustion engine 1.

A head side cooling-water passage 2a and a block side cooling-water passage 2b for allowing the cooling water to pass therethrough are respectively formed in a cylinder head 1a and a cylinder block 1b of the internal combustion engine 1. The head side cooling-water passage 2a and the block side cooling-water passage 2b communicate with each other.

The cooling-water passage 4 is connected to the head side cooling-water passage 2a. The cooling-water passage 5 is also connected to a cooling-water inlet of a radiator 5. A cooling-water outlet of the radiator 5 is connected to a thermostat valve 7 through a cooling-water passage 6.

In addition to the cooling-water passage 6, the cooling-water passage 8 and a cooling-water passage 9 are connected to the thermostat valve 7. The cooling-water passage 8 is connected to an inlet of a mechanical water pump 10 driven by the rotation torque of the crankshaft. An outlet of the mechanical water pump 10 is connected to the block side cooling-water passage 2b. The cooling-water passage 9 is connected to the head side cooling-water passage 2a.

The thermostat valve 7 serves as a flow-path switch valve for blocking off either the cooling-water passage 6 or the cooling-water passage 9 according to the temperature of the cooling water. More specifically, when the cooling water flowing through the thermostat valve 7 has a predetermined valve-opening temperature $T_1$ or lower, the thermostat valve 7 blocks off the cooling-water passage 6 as well as opens the cooling-water passage 9, thereby allowing communication between the cooling-water passage 8 and the cooling-water passage 9. When the cooling water flowing through the thermostat valve 7 has a temperature higher than the valve-opening temperature $T_1$, the thermostat valve 7 opens the cooling-water passage 6 as well as blocks off the cooling-water passage 9, thus allowing communication between the cooling-water passage 8 and the cooling-water passage 6.

A heater hose 11 is inserted in the cooling-water passage 4. The heater hose 11 is connected to the cooling-water passage 8 located between the thermostat valve 7 and the mechanical water pump 10.

A heater core 12 for exchanging heat between the cooling water and the air for heating a vehicle compartment is inserted in the heater hose 11. A cooling-water heating mechanism 19 for heating the cooling water by a heat source other than the heat generated in the internal combustion engine 1 is inserted in the heater hose 11 between the heater core 12 and the cooling-water passage 4. The cooling-water heating mechanism 19 may include a combustion heater, an electric heater and the like.

A first bypass passage 13a is connected to the heater hose 11 between the heater core 12 and the cooling-water passage 8. The first bypass passage 13a is connected to a cooling-water inlet of an electric water pump 14.

The electric water pump 14 serves as a water pump driven by an electric motor, for ejecting the cooling water introduced through the cooling-water inlet from a cooling-water outlet at a predetermined pressure.

The cooling-water outlet of the electric water pump 14 is connected to a cooling-water inlet of a heat-accumulating container 15 through a second bypass passage 13b. The heat-accumulating container 15 is a container for storing the cooling water while accumulating the heat of the cooling water. When fresh cooling water flows into the heat-accumulating container 15 through the cooling-water inlet, the heat-accumulating container 15 correspondingly discharges the hot cooling water stored therein from the cooling-water outlet. This heat-accumulating container 15 is an embodiment of the heat-accumulating apparatus of the invention.

Note that one-way valves 15a and 15b for preventing backflow of the cooling water are respectively mounted to the cooling-water inlet and outlet of the heat-accumulating container 15.

A third bypass passage 13c is connected to the cooling-water outlet of the heat-accumulating container 15. The third bypass passage 13c is also connected to the heater hose 11 between the cooling-water heating mechanism 19 and the cooling-water passage 4.

Note that, in the heater hose 11 located between the cooling-water heating mechanism 19 and the cooling-water passage 4, a portion between the cooling-water passage 4 and the portion connected to the third bypass passage 13c is referred to as a first heater hose 11a, and a portion between the cooling-water heating mechanism 19 and the portion connected to the third bypass passage 13c is referred to as a second heater hose 11b. The heater hose 11 located between the cooling-water heating mechanism 19 and the heater core 12 is referred to as a third heater hose 11c. Moreover, in the heater hose 11 located between the heater core 12 and the cooling-water passage 8, a portion between the heater core 12 and the portion connected to the first bypass passage 13a is referred to as a fourth heater hose 11d, and a portion between the cooling-water passage 8 and the portion connected to the first bypass passage 13a is referred to as a fifth heater hose 11e.

A flow-path switch valve 16 is provided at the junction of the fourth heater hose 11d, fifth heater hose 11e and first bypass passage 13a. The flow-path switch valve 16 selectively switches between communication among the three passages and blocking of any one of the three passages. For example, the flow-path switch valve 16 is driven by an actuator formed from a step motor or the like.

A first water-temperature sensor 17 for outputting an electric signal corresponding to the temperature of the cooling water flowing through the cooling-water passage 4 is mounted to the cooling-water passage 4 at a position near the internal combustion engine 1.

A second water-temperature sensor 18 for outputting an electric signal corresponding to the temperature of the cooling water flowing through the fifth heater hose 11e is mounted to the fifth heater hose 11e at a position near the portion connected with the cooling-water passage 8.

An ECU (Electronic Control Unit) 39 is also provided for the internal combustion engine 1 and the cooling-water circulating mechanism 200 thus structured. The ECU 39 controls the internal combustion engine 1 and the cooling-water circulating mechanism 200.

Figure 3:
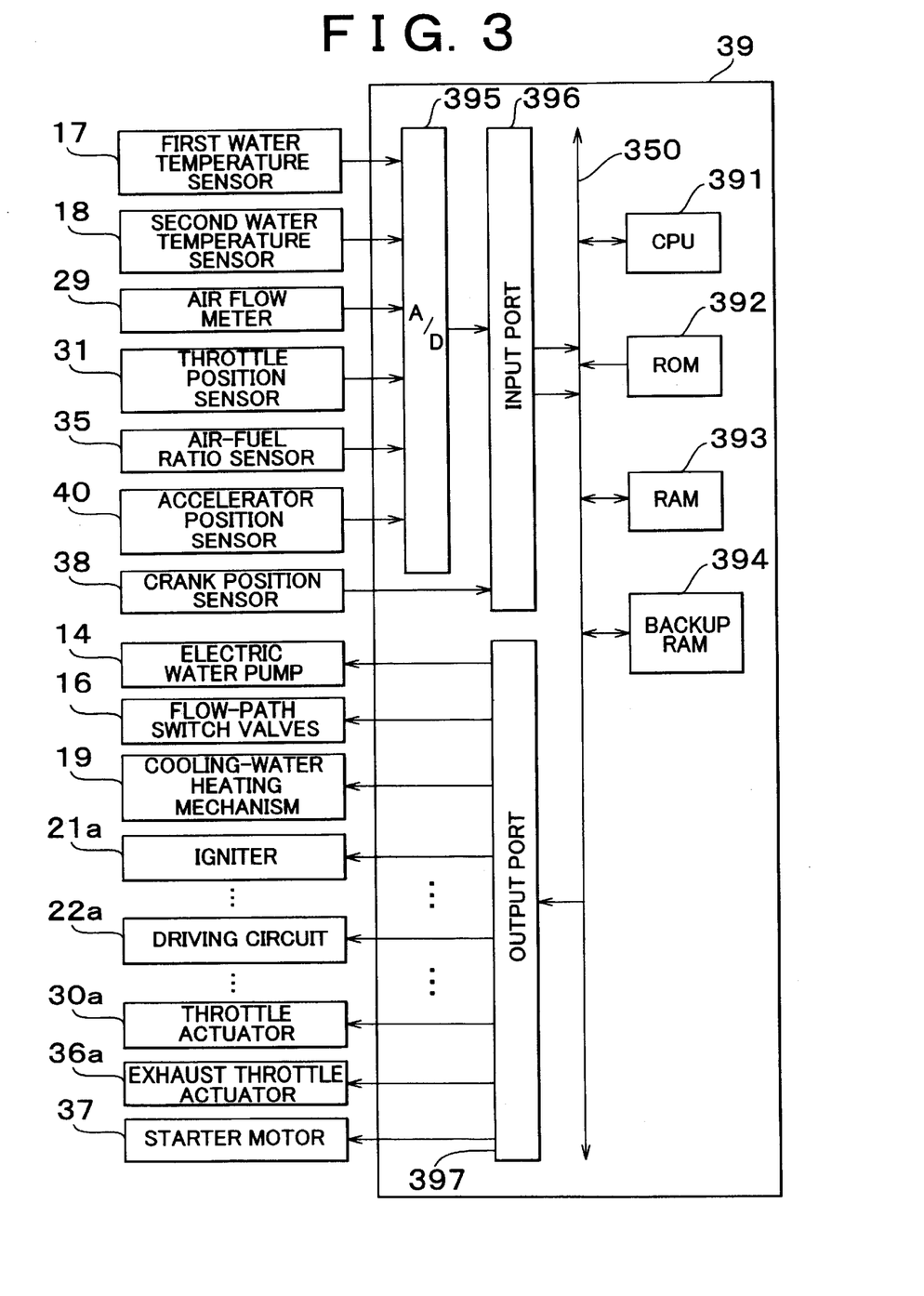
FIG. 3 is a block diagram showing the internal structure of an ECU (Electronic Control Unit)

In FIG. 3, in addition to the first water-temperature sensor 17, second water-temperature sensor 18, air flow meter 29, throttle position sensor 31, air-fuel ratio sensor 35 and crank position sensor 38, an accelerator position sensor 40 for outputting an electric signal corresponding to the operation amount of a not-shown accelerator pedal (the accelerator opening amount) is also connected to the ECU 39 through an electric wiring. Thus, the ECU 39 receives output signals from these sensors.

Connected to the ECU 39 through electric wirings are the electric water pump 14, flow-path switch valve 16, cooling-water heating mechanism 19, igniters 21a, driving circuits 22a, throttle actuator 30a, exhaust throttle actuator 36a, and starter motor 37 so as to be controlled with output signal values of the aforementioned sensors as parameters.

As shown in FIG. 3, the ECU 39 includes a CPU (Central Processing Unit) 391, a ROM (Read Only Memory) 392, a RAM (Random Access Memory) 393, a backup RAM 394, an input port 396 and an output port 397, which are connected to each other through a bi-directional bus 350. The ECU 39 further includes an A/D (Analog/Digital) converter (A/D) 395 connected to the input port 396.

The input port 396 receives the output signals of the sensors that output digital signals, for example, the crank position sensor 38, and transmits the received output signals to the CPU 391 and RAM 393.

The input port 396 receives through the A/D 395 the output signals of the sensors that output analog signals, for example, the first water-temperature sensor 17, second water-temperature sensor 18, air flow meter 29, throttle position sensor 31, air-fuel ratio sensor 35 and accelerator position sensor 40, and transmits the received output signals to the CPU 391 or RAM 393.

The output port 397 transmits a control signal from the CPU 391 to the electric water pump 14, flow-path switch valve 16, cooling-water heating mechanism 19, igniters 21a, driving circuits 22a, throttle actuator 30a, exhaust throttle actuator 36a, or starter motor 37.

The ROM 392 pre-stores application programs including a fuel injection amount control routine for determining the fuel injection amount; a fuel injection timing control routine for determining the fuel injection timing; an ignition timing control routine for determining the ignition timing; a throttle control routine for controlling the opening amount of the throttle valve 30; and an exhaust throttle control routine for controlling the opening amount of the exhaust throttle valve 36. The ROM 392 additionally pre-stores a preheating control routine for integrally controlling preheating of the internal combustion engine 1 and the air-fuel ratio of the engine.

The ROM 392 pre-stores various control maps in addition to the aforementioned application programs. For example, these control maps include a fuel injection amount control map indicating the relation between the operating state of the internal combustion engine 1 and the fuel injection amount; a fuel injection timing control map indicating the relation between the operating state of the internal combustion engine 1 and the fuel injection timing; an ignition timing control map indicating the relation between the operating state of the internal combustion engine 1 and the ignition timing; a throttle opening amount control map indicating the relation between the operating state of the internal combustion engine 1 and the opening amount of the throttle valve 30; an exhaust throttle opening amount control map indicating the relation between the operating state of the internal combustion engine 1 and the opening amount of the exhaust throttle valve 36; and a starting air-fuel ratio control map indicating the relation between the operating state of the internal combustion engine 1 and the air-fuel ratio upon starting.

The RAM 393 stores the output signals of the sensors, the operation results of the CPU 391, and the like. For example, the operation results include an engine speed calculated based on a pulse signal output from the crank position sensor 38. Various data stored in the RAM 393 is updated every time the crank position sensor 38 outputs a pulse signal.

The backup RAM 394 is a non-volatile memory that retains the data even after the internal combustion engine 100 is stopped.

The CPU 391 operates according to the application programs stored in the ROM 392 to conduct the preheating control in addition to the fuel injection control, ignition control, throttle control and exhaust throttling control.

Figure 4:
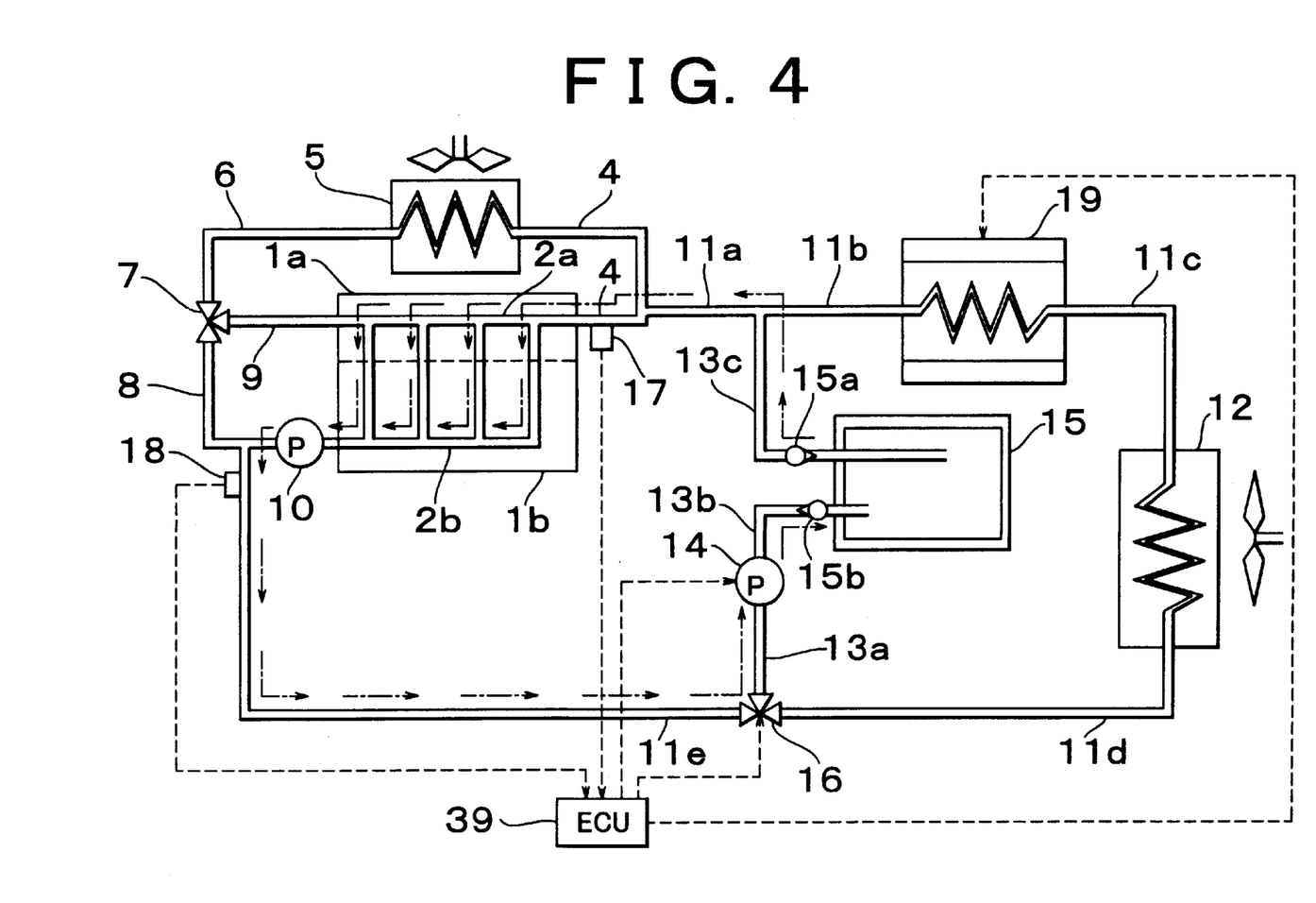
FIG. 4 is a diagram showing a cooling-water circulating circuit in the case where an internal combustion engine is preheated.

Hereinafter, the preheating control of the internal combustion engine 1 according to the invention will be described with reference to FIGS. 4 and 5. It is assumed that hot cooling water is pre-stored in the heat-accumulating container 15.

In the preheating control, when the internal combustion engine 1 is started, specifically, when an ignition switch (not shown) provided in the vehicle compartment is switched from OFF to ON, the CPU 391 first blocks off the fourth heater hose 11*d* while inhibiting application of driving electric power to the starter motor 37 and to the fuel injection valves provided for the respective cylinders of the internal combustion engine 1. The CPU 391 also controls the flow-path switch valve 16 so as to allow communication between the fifth heater hose 11*e* and the first bypass passage 13*a*, and actuates the electric water pump 14.

In this case, the mechanical water pump 10 is not actuated and only the electric water pump 14 is actuated. As a result, as shown in FIG. 4, a circulating circuit is formed in which the cooling water sequentially flows to circulate from the electric water pump 14, the second bypass passage 13*b*, heat-accumulating container 15, third bypass passage 13*c*, first heater hose 11*a*, cooling-water passage 4, head side cooling-water passage 2*a*, block side cooling-water passage 2*b*, mechanical water pump 10, cooling-water passage 8, fifth heater hose 11*e*, flow-path switch valve 16, first bypass passage 13*a*, and the electric water pump 14.

A part of the cooling water flowing from the cooling-water passage 4 into the head side cooling-water passage 2*a* in this circulating circuit flows into the fifth heater hose 11*e* through the cooling-water passage 9, thermostat valve 7 and cooling-water passage 8.

When the aforementioned circulating circuit is formed, the cooling water discharged from the electric water pump 14 flows into the heat-accumulating container 15 through the second bypass passage 13*b*, so that the hot cooling water (hereinafter, simply referred to as hot water) stored in the heat-accumulating container 15 is correspondingly discharged therefrom.

The hot water discharged from the heat-accumulating container 15 flows through the third bypass passage 13*c*, first heater hose 11*a* and cooling-water passage 4 into the head side cooling-water passage 2*a* in the internal combustion engine 1. A part of the hot water flowing into the head side cooling-water passage 2*a* flows into the block side cooling-water passage 2*b*, and the remaining hot water flows into the cooling-water passage 9.

The hot water flowing from the head side cooling-water passage 2*a* into the block side cooling-water passage 2*b* flows through the block side cooling-water passage 2*b*, and then flows into the cooling-water passage 8 through the mechanical water pump 10. The hot water flowing from the head side cooling-water passage 2*a* into the cooling-water passage 9 flows through the cooling-water passage 9, and then flows into the cooling-water passage 8 through the thermostat valve 7.

When the hot water stored in the heat-accumulating container 15 flows into the head side cooling-water passage 2*a*, block side cooling-water passage 2*b*, cooling-water passage 9 and cooling-water passage 8 (hereinafter, these passages are collectively referred to as an internal cooling-water passage), the cold cooling water staying in the internal cooling-water passage is correspondingly forced from the internal cooling-water passage into the fifth heater hose 11*e*.

When the hot water stored in the heat-accumulating container 15 fills the internal cooling-water passage as well as the cold cooling water staying in the internal cooling-water passage is discharged therefrom, the CPU 391 stops the electric water pump 14, and then allows application of the driving electric power to the starter motor 37 and the fuel injection valves 22, thus starting the internal combustion engine 1.

It is determined whether the hot water stored in the heat-accumulating container 15 has filled the internal cooling-water passage using the following methods: (1) the time period from actuation of the electric water pump 14 until the hot water in the heat-accumulating container 15 runs through the entire internal cooling-water passage (hereinafter, referred to as cooling-water arrival time) is experimentally obtained in advance. When the time passed from actuation of the electric water pump 14 becomes equal to or more than the cooling-water arrival time, it is determined that the hot water has filled the internal cooling-water passage; (2) when the output signal value of the second water-temperature sensor 18 located downstream of the internal cooling-water passage reaches a predetermined value or more, it is determined that the hot water has filled the internal cooling-water passage; and (3) a temperature sensor is mounted to the cylinder head 1*a* or cylinder block 1b. When the output signal value of the temperature sensor reaches a predetermined value or more, it is determined that the hot water has filled the internal cooling-water passage.

When application of the driving electric power to the starter motor 37 is allowed based on the determination that the hot water has filled the internal cooling-water passage, the CPU 391 applies the driving electric power to the starter motor 37, thus starting cranking of the internal combustion engine 1.

When cranking of the internal combustion engine 1 starts, the mechanical water pump 10 is actuated correspondingly. As a result, a circulating circuit is formed in which the cooling water sequentially flows to circulate from the mechanical water pump 10, the block side cooling-water passage 2b, head side cooling-water passage 2a, cooling-water passage 9, thermostat valve 7, cooling-water passage 8 and mechanical water pump 10. In other words, a circulating circuit is formed that circulates the cooling water only through the internal cooling-water passage.

Since the hot water from the heat-accumulating container 15 has filled the internal cooling-water passage, only the hot water circulates through the internal cooling-water passage, and no cold cooling water flows into the internal cooling-water passage.

As a result, the heat transmitted from the hot water stored in the heat-accumulating container 15 to the internal combustion engine 1 is not transferred to the cold cooling water, whereby the internal combustion engine 1 is rapidly preheated.

On the other hand, when application of the driving electric power to the fuel injection valves 22 is allowed based on the determination that the hot water has filled the internal cooling-water passage, the CPU 391 controls the fuel injection amount or intake air amount so as to achieve a higher air-fuel ratio than that in the case where the internal combustion engine 1 has not been preheated.

While the internal combustion engine 1 is in a cold state, the wall surfaces of the intake ports, combustion chambers and the like have a low temperature, and thus the temperature of the intake air is reduced. Accordingly, the fuel is likely to adhere to the wall surfaces of the intake port, combustion chambers and the like. As the amount of the fuel adhering to the wall surfaces (hereinafter, referred to as fuel adhesion amount) is increased, the air-fuel ratio of the mixture substantially supplied for combustion is reduced, whereby combustion of the internal combustion engine 1 is likely to be unstable. Accordingly, in the normal fuel injection control, the fuel injection amount is increased considering the fuel adhered to the wall surface while the internal combustion engine 1 is in the cold state.

Meanwhile, in the case where the internal combustion engine 1 has been preheated, the wall surfaces of the intake ports and combustion chambers have a high temperature, and thus the temperature of the intake air is raised accordingly. Therefore, the fuel is likely to be vaporized, whereby the fuel adhesion amount is reduced.

It is now assumed that the fuel adhesion amount is reduced as a result of preheating of the internal combustion engine 1. In this case, if the fuel injection amount is increased as in the case where the internal combustion engine 1 has not been preheated, the mixture becomes fuel rich, whereby a relatively large amount of unburned fuel components may possibly be discharged from the internal combustion engine 1.

Accordingly, in the preheating control of the present embodiment, the CPU 391 sets the air-fuel ratio of the internal combustion engine 1 that has been preheated to a value higher than that of the internal combustion engine 1 that has not been preheated. The air-fuel ratio as used herein refers to the ratio of the intake air amount per cylinder 20 to the fuel amount injected from the fuel injection valve 22.

The air-fuel ratio can be increased by, for example, reducing the fuel injection amount; increasing the intake air amount; and increasing the intake air amount while reducing the fuel injection amount. However, if the air-fuel ratio is increased by merely reducing the fuel injection amount, the engine speed may possibly be unnecessarily reduced. Therefore, the air-fuel ratio is preferably increased either by increasing the intake air amount or by increasing the intake air amount while reducing the fuel injection amount.

Thus, by setting the air-fuel ratio of the preheated internal combustion engine 1 to a value higher than that of the non-preheated internal combustion engine 1, the mixture does not become fuel rich. This prevents increase in the amount of the unburned fuel components discharged from the internal combustion engine 1. As a result, degradation in exhaust emission can be prevented upon starting of the internal combustion engine 1.

Hereinafter, the preheating control according to the present embodiment will be specifically described in connection with the flowchart of FIG. 5.

Figure 5:
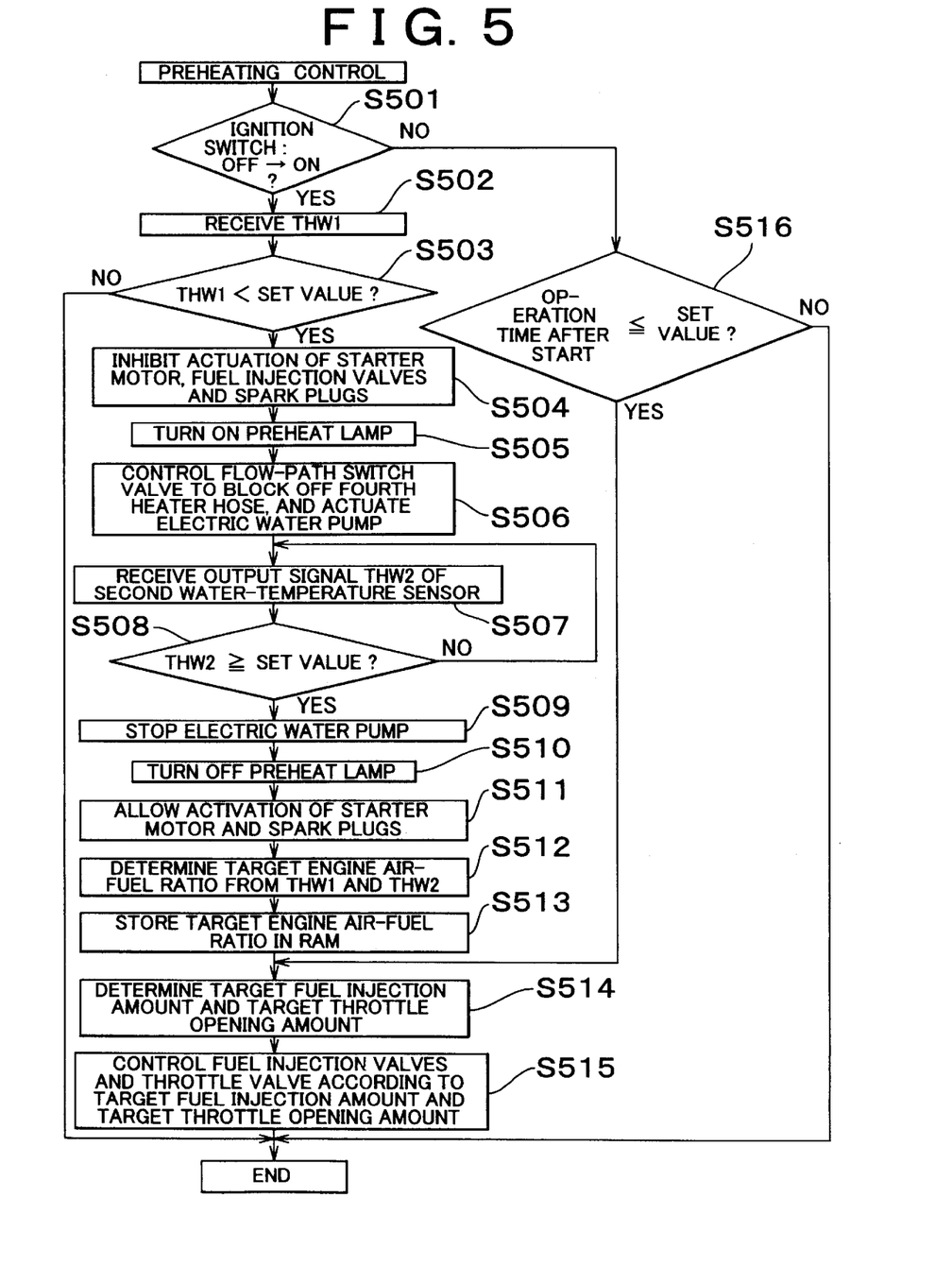
FIG. 5 is a flowchart illustrating a preheating control routine according to a first embodiment of the invention.

The flowchart of FIG. 5 illustrates a preheating control routine that is triggered and executed by the CPU 391 when the not-shown ignition switch provided in the vehicle compartment is switched from OFF to ON.

In the preheating control routine, the CPU 391 first determines in step S501 whether the ignition switch has been switched from OFF to ON.

If it is determined in step S501 that the ignition switch has been switched from OFF to ON, the CPU 391 proceeds to step S502 and receives an output signal value (cooling-water temperature) THW1 of the first water-temperature sensor 17 and/or second water-temperature sensor 18.

In step S503, the CPU 391 determines whether the cooling-water temperature THW1 received in step S502 is less than a predetermined value THWs, i.e., preheating of the internal combustion engine 1 is necessary.

If it is determined in step S503 that the cooling-water temperature THW1 is equal to or higher than the predetermined value THWs, the CPU 391 determines that preheating of the internal combustion engine 1 is not necessary, and terminates execution of the routine. In this case, the CPU 391 executes the normal fuel injection control.

On the other hand, if it is determined in step S503 that the cooling-water temperature THW1 is less than the predetermined value THWs, the CPU 391 proceeds to step S504, and inhibits actuation of the starter motor 37, fuel injection valves 22 and spark plugs 21.

In step S505, the CPU 391 turns on a preheat lamp (not shown) provided in the vehicle compartment, thereby notifying the driver of the vehicle of execution of the preheating control.

In step S506, the CPU 391 controls the flow-path switch valve 16 so as to block off the fourth heater hose 11d and to allow for communication between the fifth heater hose 11e and the first bypass passage 13a. The CPU 391 also applies the driving electric power to the electric water pump 14 so as to form a circulating circuit including the heat-accumulating container 15 and the internal cooling-water passage, thereby supplying the hot water stored in the heat-accumulating container 15 into the internal cooling-water passage.

In step S507, the CPU 391 receives an output signal value (cooling-water temperature) THW2 of the second water-temperature sensor 18.

In step S508, the CPU 391 determines whether the cooling-water temperature THW2 received in step S502 is equal to or higher than the predetermined value THWs.

If it is determined in step S508 that the output signal value THW2 of the second water-temperature sensor 18 is less than the predetermined value THWs, the CPU 391 determines that the hot water stored in the heat-accumulating container 15 has not run through the entire internal cooling-water passage, and returns to step S507.

On the other hand, if it is determined in step S508 that the output signal value THW2 of the second water-temperature sensor 18 is equal to or higher than the predetermined value THWs, the CPU 391 determines that the hot water stored in the heat-accumulating container 15 has run through the entire internal cooling-water passage, and proceeds to step S509.

In step S509, the CPU 391 discontinues application of the driving electric power to the electric water pump 14, thereby discontinuing circulation of the cooling water.

In step S510, the CPU 391 turns off the preheat lamp in the vehicle compartment, so as to notify the driver that the preheating of the internal combustion engine 1 is completed.

In step S511, the CPU 391 allows actuation of the starter motor 37 and the spark plugs 21.

In step S512, the CPU 391 estimates the wall-surface temperature of the intake ports and the combustion chambers based on the deviation of the cooling-water temperature THW2 received in step S508 from the cooling-water temperature THW1 received in step S502. The CPU 391 determines a target air-fuel ratio of the internal combustion engine 1 using the estimated value as a parameter.

At this time, the CPU 391 sets the target air-fuel ratio to a higher (leaner) value as the wall-surface temperature of the intake ports and the combustion chambers is higher, and to a lower (richer) value as the wall-surface temperature is lower.

The relation between the cooling-water temperatures THW1, THW2 and the target air-fuel ratio may be experimentally obtained in advance, and may be stored in the ROM 392 as a map.

In step S513, the CPU 391 stores the target air-fuel ratio determined in step S512 in a predetermined storage area of the RAM 393.

In step S514, the CPU 391 determines a target fuel injection amount and a target intake air amount so as to realize the target air-fuel ratio determined in step S512, and then determines a target opening amount of the throttle valve 39 according to the target intake air amount.

In order to increase the target air-fuel ratio, it is preferable that the CPU 391 reduces the target fuel injection amount while increasing the target intake air amount. This is in order to prevent excessive reduction in engine speed. In other words, it is preferable that the CPU 391 increases the target fuel injection amount while increasing the target throttle opening amount, in order to increase the target air-fuel ratio.

In step S515, the CPU 391 controls the driving circuits 22a and the throttle actuator 30a based on the target fuel injection amount and the target throttle opening amount determined in step S513, and then terminates execution of the routine.

If it is determined in step S501 that the ignition switch has not been switched OFF to ON, the CPU 391 proceeds to step S516, and determines whether the internal combustion engine 1 has been in operation for a predetermined warm-up time or less since starting thereof. The warm-up time may either be a fixed value or a variable value that varies with the cooling-water temperature right before starting (e.g., cooling-water temperature THW1).

If it is determined in step S516 that the internal combustion engine 1 has been in operation for more than the predetermined warm-up time since starting thereof, the CPU 391 determines that warm-up of the internal combustion engine 1 has already been completed. Thus, the CPU 391 terminates execution of the routine, and executes the normal fuel injection control and throttle control.

On the other hand, if it is determined in step S516 that the internal combustion engine 1 has been in operation for the predetermined warm-up time or less since starting thereof, the CPU 391 determines that warm-up of the internal combustion engine 1 has not been completed, and proceeds to step S514.

In step S514, the CPU 391 reads the target air-fuel ratio stored in the predetermined storage area of the RAM 393, and determines a target fuel injection amount and a target throttle opening amount using the target air-fuel ratio, engine speed, and accelerator opening amount as parameters.

In step S515, the CPU 391 controls the driving circuits 22a and the throttle actuator 30a based on the target fuel injection amount and the target throttle opening amount determined in step S513, and then terminates execution of the routine.

The CPU 391 thus executes the preheating control routine, whereby the engine preheating apparatus, air-fuel ratio controller, and intake-air amount controller according to the invention are implemented.

According to the preheating control of the present embodiment, in the case where the internal combustion engine 1 has been preheated with the hot water in the heat-accumulating container 15 before starting thereof, the air-fuel ratio is controlled in accordance with the wall-surface temperature of the intake ports, combustion chambers and the like that have been heated by the preheating. Therefore, in the case where the internal combustion engine 1 has been preheated, the air-fuel ratio can be set to a value higher than that of the internal combustion engine 1 that has not been preheated.

As a result, the air-fuel ratio is not excessively reduced when the fuel adhesion amount is relatively small. Thus, the amount of unburned fuel components discharged from the internal combustion engine 1 is reduced, whereby degradation in exhaust emission is suppressed.

In the case where the internal combustion engine 1 is preheated, vaporization of the fuel is facilitated as well as the temperature in the cylinders 20 becomes higher as compared to the case of the internal combustion engine 1 that is not preheated. Therefore, combustion is stabilized as compared with the case where the internal combustion engine 1 is not preheated. Thus, when the internal combustion engine 1 is preheated, it is also possible to increase the air-fuel ratio by the amount equal to or larger than the amount by which the fuel adhesion amount is reduced.

With the air-fuel ratio being thus increased, oxygen concentration in the exhaust is increased, whereby oxidation in the exhaust purifying catalyst 33 is facilitated. This enables an increased purifying ratio of the exhaust purifying catalyst 33 at a low temperature, and early activation of the exhaust purifying catalyst 33.

As a result, the amount of unburned fuel components discharged from the internal combustion engine 1 is reduced, as well as the purifying ratio of unburned fuel components in the exhaust purifying catalyst 33 is improved. Accordingly, the amount of unburned fuel components discharged into the atmosphere can further be reduced.

According to the preheating control of the present embodiment, the air-fuel ratio is increased either by increasing the intake air amount or by reducing the fuel injection amount while increasing the intake air amount. Therefore, the engine speed is not excessively reduced, whereby degradation in drivability is also prevented.

Second Embodiment

Hereinafter, a second embodiment of the internal combustion engine of the invention will be described in connection with FIG. 6. Only the structure different from that of the first embodiment will be described herein, and description of the same structure will be omitted.

According to the first embodiment, in the case where the internal combustion engine 1 is preheated before starting thereof, the air-fuel ratio upon and immediately after starting is set to a value higher than that in the case where the internal combustion engine 1 is not preheated. In the present embodiment, however, in the case where the internal combustion engine 1 is preheated, the ignition timing upon and immediately after starting is retarded as compared to the ignition timing of the internal combustion engine 1 that is not preheated.

Regarding early activation of the exhaust purifying catalyst 33, the following technique is known: when the exhaust purifying catalyst 33 is not activated as in the case where the internal combustion engine 1 is cold-started, the ignition timing is retarded to increase the exhaust temperature, thus enabling early activation of the exhaust purifying catalyst 33 with the heat of the exhaust gas. However, if the ignition timing is retarded while the internal combustion engine 1 is in a cold state, combustion is likely to be unstable, thereby possibly inducing accidental fire and the like. Accordingly, in the normal ignition control, the retardation amount of the ignition timing is limited while the internal combustion engine 1 is in the cold state.

Meanwhile, in the case where the internal combustion engine 1 is preheated, the wall-surface temperature of the intake ports and combustion chambers is raised, and thus the temperature of the intake air and the compression end temperature of the mixture are also raised accordingly. Therefore, combustion is likely to be stabilized.

It is now assumed that combustion stability is ensured by preheating of the internal combustion engine 1. In this case, if the degree of retarding the ignition timing is limited as compared with the ignition timing of the internal combustion engine 1 that is not preheated, the exhaust temperature cannot sufficiently be raised. As a result, it takes a long time to activate the exhaust purifying catalyst 33.

Accordingly, in the preheating control of the present embodiment, the CPU 391 retards the ignition timing of the internal combustion engine 1 that is preheated as compared with that of the internal combustion engine 1 that is not preheated.

In this case, the degree of retarding the ignition timing can be increased without destabilizing combustion of the internal combustion engine 1, thereby allowing sufficient increase in the exhaust temperature. This enables early activation of the exhaust purifying catalyst 33.

Hereinafter, the preheating control of the present embodiment will be specifically described in connection with the flowchart of FIG. 6.

Figure 6:
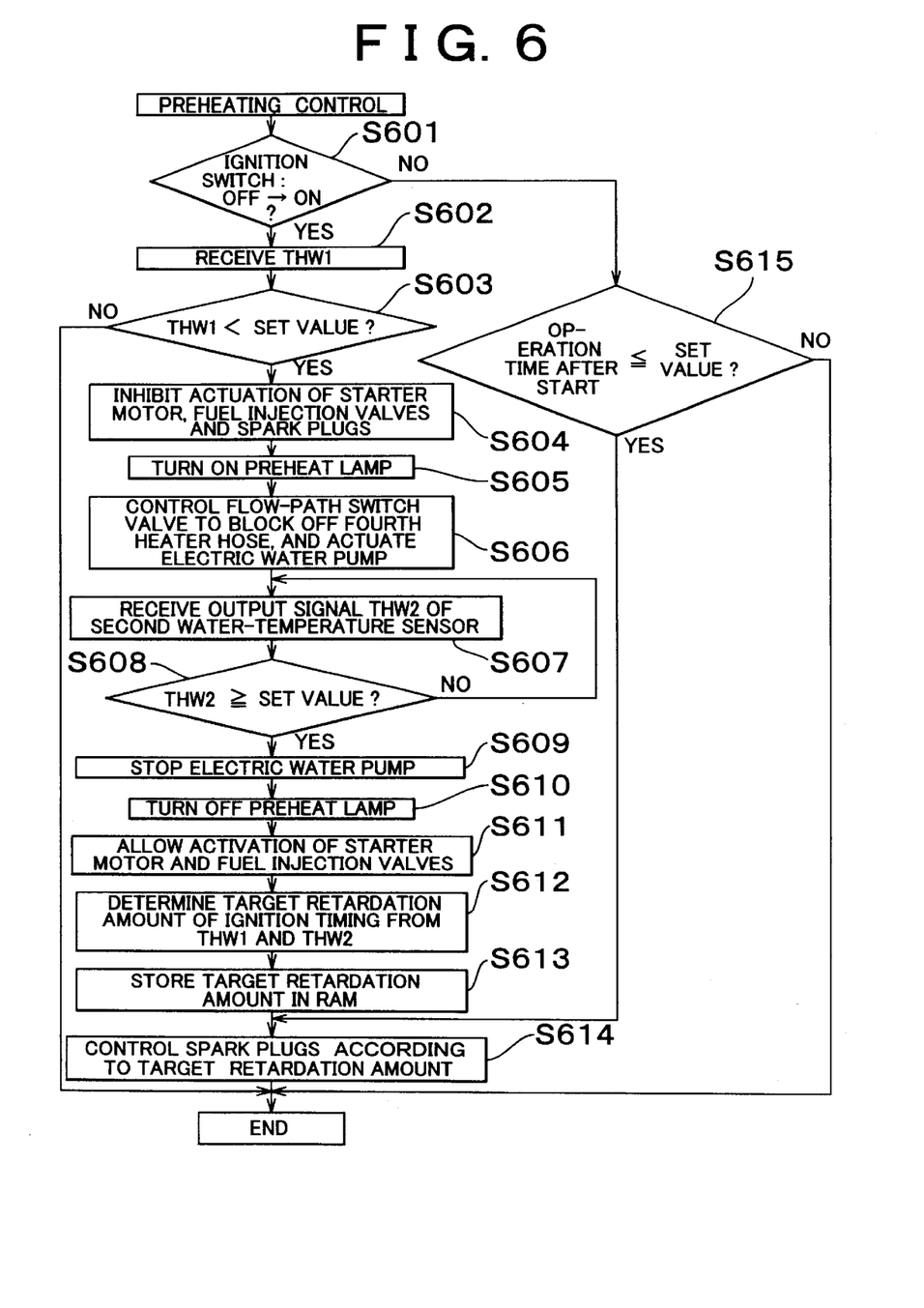
FIG. 6 is a flowchart illustrating a preheating control routine according to a second embodiment of the invention.

The flowchart of FIG. 6 illustrates a preheating control routine that is triggered and executed by the CPU 391 when the ignition switch (not shown) provided in the vehicle compartment is switched from OFF to ON.

In the preheating control routine, the CPU 391 first determines in step S601 whether the ignition switch has been switched from OFF to ON.

If it is determined in step S601 that the ignition switch has been switched from OFF to ON, the CPU 391 proceeds to step S602 and receives an output signal value (cooling-water temperature) THW1 of the first water-temperature sensor 17 and/or second water temperature sensor 18.

In step S603, the CPU 391 determines whether or not the cooling-water temperature THW1 received in step S602 is less than a predetermined value THWs, i.e., whether preheating of the internal combustion engine 1 is necessary.

If it is determined in step S603 that the cooling-water temperature THW1 is equal to or higher than the predetermined value THWs, the CPU 391 determines that preheating of the internal combustion engine 1 is not necessary, and terminates execution of the routine. In this case, the CPU 391 executes the normal ignition control.

On the other hand, if it is determined in step S603 that the cooling-water temperature THW1 is less than the predetermined value THWs, the CPU 391 proceeds to step S604, and inhibits actuation of the starter motor 37, fuel injection valves 22 and spark plugs 21.

In step S605, the CPU 391 turns on a preheat lamp (not shown) provided in the vehicle compartment, thereby notifying the driver of the vehicle of execution of the preheating control.

In step S606, the CPU 391 controls the flow-path switch valve 16 so as to block off the fourth heater hose 11d and allow for communication between the fifth heater hose 11e and the first bypass passage 13a. The CPU 391 also applies the driving electric power to the electric water pump 14 so as to form a circulating circuit including the heat-accumulating container 15 and the intra-engine cooling-water path, thereby supplying the hot water stored in the heat-accumulating container 15 into the internal cooling-water passage.

In step S607, the CPU 391 receives an output signal value (cooling-water temperature) THW2 of the second water-temperature sensor 18.

In step S608, the CPU 391 determines whether or not the cooling-water temperature THW2 received in step S602 is equal to or higher than the predetermined value THWs.

If it is determined in step S608 that the output signal value THW2 of the second water-temperature sensor 18 is less than the predetermined value THWs, the CPU 391 determines that the hot water stored in the heat-accumulating container 15 has not run through the entire internal cooling-water passage, and returns to step S607.

On the other hand, if it is determined in step S608 that the output signal value THW2 of the second water-temperature sensor 18 is equal to or higher than the predetermined value THWs, the CPU 391 determines that the hot water stored in the heat-accumulating container 15 has run through the entire internal cooling-water passage, and proceeds to step S609.

In step S609, the CPU 391 discontinues application of the driving electric power to the electric water pump 14, thereby discontinuing circulation of the cooling water.

In step S610, the CPU 391 turns off the preheat lamp in the vehicle compartment, thereby notifying the driver that the preheating of the internal combustion engine 1 is completed.

In step S611, the CPU 391 allows actuation of the starter motor 37 and the fuel injection valves 22.

In step S612, the CPU 391 estimates the wall-surface temperature of the intake ports and the combustion chambers based on the deviation of the cooling-water temperature THW2 received in step S608 from the cooling-water temperature THW1 received in step S602. The CPU 391 determines a target retardation amount of the ignition timing using the estimated value as a parameter.

At this time, the CPU 391 sets the target retardation amount to a higher value as the wall-surface temperature of the intake ports and the combustion chambers is higher, and to a lower value as the wall-surface temperature is lower.

The relation between the cooling-water temperatures THW1, THW2 and the target degree of retardation may be experimentally obtained in advance, and may be stored in the ROM 392 as a map.

In step S613, the CPU 391 stores the target degree of retardation determined in step S612 in a predetermined storage area of the RAM 393.

In step S614, the CPU 391 controls the igniters 21a according to the target degree of retardation determined in step S612, and then terminates execution of the routine.

If it is determined in step S601 that the ignition switch has not been switched OFF to ON, the CPU 391 proceeds to step S615, and determines whether the internal combustion engine 1 has been in operation for a predetermined warm-up time or less since starting thereof.

If it is determined in step S615 that the internal combustion engine 1 has been in operation for more than the predetermined warm-up time since starting thereof, the CPU 391 determines that warm-up of the internal combustion engine 1 has already been completed. Thus, the CPU 391 terminates execution of the routine, and executes the normal ignition control.

On the other hand, if it is determined in step S615 that the internal combustion engine 1 has been in operation for the predetermined warm-up time or less since starting thereof, the CPU 391 determines that warm-up of the internal combustion engine 1 has not been completed, and proceeds to step S614.

In step S614, the CPU 391 reads the target retardation amount stored in the predetermined storage area of the RAM 393, and controls the igniters 21a according to the target retardation amount. Then, the CPU 391 terminates execution of the routine.

The CPU 391 thus executes the preheating control routine, whereby the engine preheating apparatus and the ignition-timing controller according to the invention are implemented.

Thus, according to the preheating control of the present embodiment, in the case where the internal combustion engine 1 has been preheated with the hot water in the heat-accumulating container 15 before starting thereof, the retardation amount of the ignition timing is controlled according to the wall-surface temperature of the intake ports, combustion chambers and the like that have been heated by the preheating. Thus, in the case where the internal combustion engine 1 is preheated, the ignition timing of the internal combustion engine 1 that is preheated as compared with that of the internal combustion engine 1 that is not preheated.

As a result, the degree of retardation of the ignition timing is not limited when combustion stability of the internal combustion engine 1 has been ensured. Accordingly, the temperature of the exhaust discharged from the internal combustion engine 1 can be sufficiently raised, allowing early activation of the exhaust purifying catalyst 33 and thus improvement in exhaust emission upon cold starting.

As the degree of retardation of the ignition timing is increased, the ratio of the combustion energy of the mixture being reflected in the rotation torque of the crankshaft is reduced, whereby the engine speed may possibly be reduced. Accordingly, the retardation amount of the ignition timing may be increased by increasing the opening amount of the throttle valve 30 so as to increase the intake air amount of the internal combustion engine 1. In this case, the combustion energy of the mixture is increased due to the increased intake air amount, whereby excessive reduction in the engine speed is suppressed.

The air-fuel ratio control of the first embodiment may be combined with the ignition retardation control of the second embodiment.

In this case, when the internal combustion engine 1 has been preheated before starting thereof, the air-fuel ratio and the retardation amount of the ignition timing are controlled according to the wall-surface temperature of the intake ports, combustion chambers and the like that have been heated by the preheating. Thus, in the case where the internal combustion engine 1 is preheated, the air-fuel ratio can be set to a higher value as well as the ignition timing can be retarded as compared to the case where the internal combustion engine 1 is not preheated.

As a result, the air-fuel ratio is not excessively reduced when the fuel adhesion amount is relatively small. In addition, the retardation amount of the ignition timing is not limited when combustion stability of the internal combustion engine 1 has been ensured. This enables early activation of the exhaust purifying catalyst 33 while reducing the amount of unburned fuel components discharged from the internal combustion engine 1, and thus enables further improvement in exhaust emission.

In the internal combustion engine of the invention, the air-fuel ratio and/or the retardation amount of the ignition timing are controlled according to whether or not the internal combustion engine has been preheated. Accordingly, in the case where the internal combustion engine is preheated, the air-fuel ratio can be set to a higher value and/or the ignition timing can be retarded by a larger amount as compared to the case where the internal combustion engine is not preheated.

Therefore, according to the internal combustion engine of the invention, in the case where the internal combustion engine has been preheated upon or before starting thereof, the air-fuel ratio is prevented from becoming rich when the fuel adhesion amount is relatively small, and/or the retardation amount of the ignition timing is not limited when combustion stability of the internal combustion engine has been ensured. This enables reduction in the amount of unburned fuel components discharged from the internal combustion engine and/or early activation of the exhaust purifying catalyst by increasing the exhaust temperature of the internal combustion engine.

What is claimed is:

1. An internal combustion engine, comprising:
    an engine preheating apparatus which preheats the internal combustion engine upon or before starting thereof; and
    an air-fuel ratio controller which sets an air-fuel ratio of the internal combustion engine that is preheated by the engine preheating apparatus to a value higher than the air-fuel ratio of the internal combustion engine that is not preheated by the engine preheating apparatus.

2. An internal combustion engine according to claim 1, wherein the air-fuel ratio controller changes the air-fuel ratio according to a temperature of the internal combustion engine upon completion of preheating of the internal combustion engine.

3. An internal combustion engine according to claim 1, wherein the engine preheating apparatus comprises:
    a heating medium flow path which is formed in the internal combustion engine and allows a heating medium to pass therethrough, a heat accumulating apparatus which accumulates heat of the heating medium, and a heating medium supplying apparatus which supplies the heating medium in the heat accumulating apparatus to the heating medium flow path upon or before starting of the internal combustion engine.

4. An internal combustion engine according to claim 1, further comprising an intake air amount controller which sets an intake air amount of the internal combustion engine that is preheated, to a value larger than the intake air amount of the internal combustion engine that is not preheated.

5. An internal combustion engine, comprising:

an engine preheating apparatus which preheats the internal combustion engine upon or before starting thereof;

an air-fuel ratio controller which sets an air-fuel ratio of the internal combustion engine that is preheated by the engine preheating apparatus to a value higher than the air-fuel ratio of the internal combustion engine that is not preheated; and an ignition-timing controller which retards an ignition timing of the internal combustion engine that is preheated as compared with the ignition timing of the internal combustion engine that is not preheated.

6. An internal combustion engine according to claim 5, wherein the air-fuel ratio controller changes the air-fuel ratio according to a temperature of the internal combustion engine upon completion of preheating of the internal combustion engine.

7. An internal combustion engine according to claim 5, wherein the ignition timing controller changes a degree of retarding the ignition timing according to a temperature of the internal combustion engine upon completion of preheating the internal combustion engine.

8. An internal combustion engine according to claim 5, wherein the engine preheating apparatus comprises:

a heating medium flow path which is formed in the internal combustion engine and allows a heating medium to pass therethrough, a heat accumulating apparatus which accumulates heat of the heating medium, and a heating medium supplying apparatus which supplies the heating medium in the heat accumulating apparatus to the heating medium flow path upon or before starting of the internal combustion engine.

9. An internal combustion engine according to claim 5, further comprising an intake air amount controller which sets an intake air amount of the internal combustion engine that is preheated to a value larger than the intake air amount of the internal combustion engine that is not preheated.

10. A method for controlling an internal combustion engine, comprising the steps of:

preheating the internal combustion engine upon or before starting thereof; and setting an air-fuel ratio of the internal combustion engine that is preheated to a value higher than the air-fuel ratio of the internal combustion engine that is not preheated.

11. A method according to claim 10, wherein the air-fuel ratio is changed according to a temperature of the internal combustion engine upon completion of preheating of the internal combustion engine.

12. A method according to claim 10, wherein the step of preheating the internal combustion engine comprises:

introducing a heating medium into the internal combustion engine, accumulating heat of the heating medium in a heat accumulating apparatus; and supplying the heating medium from the heat accumulating apparatus, to a heating medium flow path formed in the internal combustion engine, upon or before starting of the internal combustion engine.

13. A method according to claim 10, wherein an intake air amount of the internal combustion engine that is preheated by the engine preheating apparatus is set to a value larger than the intake air amount of the internal combustion engine that is not preheated.

14. A method for controlling an internal combustion engine, comprising the steps of:

preheating the internal combustion engine upon or before starting thereof;

setting an air-fuel ratio of the internal combustion engine that is preheated to a value higher than the air-fuel ratio of the internal combustion engine that is not preheated; and retarding an ignition timing of the internal combustion engine that is preheated as compared with the ignition timing of the internal combustion engine that is not preheated.

15. A method according to claim 14, wherein the air-fuel ratio is changed according to a temperature of the internal combustion engine upon completion of preheating.

16. A method according to claim 14, wherein a degree of retarding the ignition timing is changed according to a temperature of the internal combustion engine upon completion of preheating.

17. A method according to claim 14, wherein the step of preheating the internal combustion engine comprises:

introducing a heating medium into the internal combustion engine, accumulating heat of the heating medium in a heat accumulating apparatus; and supplying the heating medium from the heat accumulating apparatus, to a heating medium flow path formed in the internal combustion engine, upon or before starting of the internal combustion engine.

18. A method according to claim 14, wherein an intake air amount of the internal combustion engine that is preheated is set to a value larger than the intake air amount of the internal combustion engine that is not preheated.

* * * * *